(12) United States Patent
Eder et al.

(10) Patent No.: US 11,463,119 B2
(45) Date of Patent: Oct. 4, 2022

(54) HIGH FREQUENCY RADIO INCLUDING AN ADJUSTABLE-BANDWIDTH TUNABLE BANDPASS FILTER FOR IMPROVED DETECTION OF INCOMING CALLS AND METHODS FOR PROCESSING INCOMING CALLS

(71) Applicant: ELBIT SYSTEMS C4I AND CYBER LTD, Netanya (IL)

(72) Inventors: Yehuda Gillbert Eder, Netanya (IL); Yitzhack Magid, Netanya (IL)

(73) Assignee: ELBIT SYSTEMS C4I AND CYBER LTD, Netanya (IL)

(*) Notice: Subject to any disclaimer, the term of this patent is extended or adjusted under 35 U.S.C. 154(b) by 0 days.

(21) Appl. No.: 17/495,840

(22) Filed: Oct. 7, 2021

(65) Prior Publication Data

US 2022/0029652 A1    Jan. 27, 2022

Related U.S. Application Data

(63) Continuation of application No. PCT/IL2020/050129, filed on Feb. 4, 2020.

(51) Int. Cl.
    H04B 1/10      (2006.01)
    H04B 1/00      (2006.01)

(52) U.S. Cl.
    CPC ........... *H04B 1/1036* (2013.01); *H04B 1/001* (2013.01); *H04B 1/0078* (2013.01); *H04B 2001/1054* (2013.01)

(58) Field of Classification Search
    CPC .... H04B 1/1036; H04B 1/001; H04B 1/0078; H04B 2001/1054; H04B 1/0035; H04B 1/0057; H03H 7/12
    See application file for complete search history.

(56) References Cited

U.S. PATENT DOCUMENTS

| | | | | |
|---|---|---|---|---|
| 4,509,206 A | * | 4/1985 | Carpe ................. | H03G 3/3052 455/249.1 |
| 5,363,402 A | * | 11/1994 | Harmon ................. | H04B 1/38 380/34 |

(Continued)

FOREIGN PATENT DOCUMENTS

| CN | 101567674 A | 10/2009 |
|---|---|---|
| CN | 106712805 A | 5/2017 |

OTHER PUBLICATIONS

Staring link establishment for high-frequency radio. In MILCOM 2015-2015 IEEE Military 1-41 Communications Conference, pp. 1433-1438 IEEE, 2015. (Retrieved on Mar. 9, 2019) Retrieved from the internet:<http://mac-ee2ll.nmsu.edu/hflpapers/staring.pdf> Johnson, E. Oct. 26, 2015 (Oct. 26, 2015) 015 (Oct. 26, 2015) Section 1, subsection A, Section III subsection, subsection B, section IV, subsection C.

(Continued)

*Primary Examiner* — Jinsong Hu
*Assistant Examiner* — Rui M Hu

(57) ABSTRACT

A high frequency (HF) radio configured to process an incoming call from another HF radio, the HF radio comprising: an adjustable-bandwidth tunable bandpass filter configured to provide HF signals that are within an adjustable-bandwidth Staring Frequency Band (SFB), being a subset of a HF band, the HF signals including analog calling signals that are indicative of incoming calls; a receive path configured to convert the analog calling signals to digital calling signals; a plurality of receivers configured to monitor assigned Automatic Link Establishment (ALE) channels within the SFB for the digital calling signals; and a controller configured to: establish a communication link between the HF radio and the another HF radio, in response to a given receiver of the receivers decoding a digital calling signal that is indicative of the incoming call; and select the SFB and the (Continued)

assigned ALE channels, based on an indication of ionospheric propagation conditions.

14 Claims, 7 Drawing Sheets

(56) References Cited

U.S. PATENT DOCUMENTS

| | | | | |
|---|---|---|---|---|
| 5,465,410 | A * | 11/1995 | Hiben | H04B 1/1027 |
| | | | | 455/340 |
| 5,610,984 | A * | 3/1997 | Lennen | G01S 19/32 |
| | | | | 375/150 |
| 5,796,772 | A * | 8/1998 | Smith | H04B 1/406 |
| | | | | 375/259 |
| 5,943,629 | A * | 8/1999 | Ballard | G01S 19/072 |
| | | | | 702/2 |
| 6,072,994 | A * | 6/2000 | Phillips | H04B 1/0003 |
| | | | | 455/280 |
| 7,180,970 | B1 * | 2/2007 | Warnagiris | H04L 7/0008 |
| | | | | 375/354 |
| 9,282,500 | B1 * | 3/2016 | Thommana | H04W 40/02 |
| 10,051,606 | B1 * | 8/2018 | Nelson | H04W 72/02 |
| 10,080,254 | B2 * | 9/2018 | Pera | H04B 1/0075 |
| 10,805,030 | B1 * | 10/2020 | Al Ahmad | H01Q 23/00 |
| 2005/0107041 | A1 * | 5/2005 | Eder | H04W 88/06 |
| | | | | 455/403 |
| 2005/0172197 | A1 * | 8/2005 | Chamberlain | H04L 1/0009 |
| | | | | 714/748 |
| 2008/0242239 | A1 | 10/2008 | Wilson et al. | |
| 2009/0134953 | A1 | 5/2009 | Hunt et al. | |
| 2010/0118921 | A1 * | 5/2010 | Abdelmonem | H04B 17/345 |
| | | | | 375/350 |
| 2012/0040618 | A1 * | 2/2012 | Furman | H04W 28/18 |
| | | | | 455/62 |
| 2012/0129480 | A1 | 5/2012 | Ruelke | |
| 2013/0252558 | A1 * | 9/2013 | Nieto | H04W 72/08 |
| | | | | 455/73 |
| 2014/0079107 | A1 * | 3/2014 | Abdelmonem | H04B 1/1036 |
| | | | | 375/350 |
| 2014/0256342 | A1 | 9/2014 | Abdelmonem et al. | |
| 2015/0038101 | A1 * | 2/2015 | Maxim | H03J 5/242 |
| | | | | 455/340 |
| 2015/0188506 | A1 * | 7/2015 | Maiuzzo | H03G 3/3042 |
| | | | | 455/234.1 |
| 2015/0256219 | A1 * | 9/2015 | Linden | H04W 56/0015 |
| | | | | 375/133 |
| 2018/0205399 | A1 | 7/2018 | Baringer et al. | |
| 2019/0173501 | A1 * | 6/2019 | Oh | H04B 1/0057 |
| 2019/0173564 | A1 * | 6/2019 | Li | H04B 7/0825 |
| 2019/0273314 | A1 * | 9/2019 | Wloczysiak | H04B 1/109 |
| 2022/0085849 | A1 * | 3/2022 | Kozlov | H04W 76/10 |

OTHER PUBLICATIONS

Cognitive HF communication system with adaptive complementary codes. In 2016 Eighth 1-41 International Conference on Ubiquitous and Future Networks (ICUFN), pp. 319-321. IEEE, 2016.(Retrieved on Apr. 9, 2019). Retrieved from the Internet: <https://www.researchgate.net/profile/Pekka_Pirinen/publication/306064 336_Cognitive_HF_communication_system_with_adaptive_complementary_codes/links/59fc 73 f3a6fdcca 1f2953 936/Cognitive-HF-communicationsystem-with-adaptive-complementary-codes. pdf> Vartiainen, J. et al. Jul. 5, 2016.

Empowering HF systems with cognitive wideband radio capabilities. Thales-communications 141 & security (Retrieved on Apr. 9, 2019). Retrieved from the Internet: <http://lamyc.free.fr/ publications/IST123-2014.pdf> Lamy-Bergot, C. Dec. 31, 2014 (Dec. 31, 2014) Section 2.2 : Rationale behind the ALE 4G mechanism.

Instantaneous Channel Access for 3G-ALE Systems. Andree Bengtsson, Department of Electrical and Information Technology, Faculty of Engineering, LTH, Lund University, Aug. 31, 2014.

Wideband ALE—The Next Generation of HF. Eric E. Johnson. Presented at the 2016 Nordic HF Radio Conference HF '16, Aug. 2016, Fårö, Sweden.

Tunable Band-Pass Filter Using RF MEMS Capacitance and Transmission Line. Progress in Electromagnetics Research C, vol. 23, 233(247, 2011), S. C. Sahal, 4, *, U. Hanke 2, H. Sagberg 3, T. A. Fjeldly 1, and T. Accepted Aug. 25, 2011, Scheduled Aug. 31, 2011 * Corresponding author: Shimul Chandra Saha.

Catherine Dr et al: "STO-MP-IST-123 1 -12 Unclassified/Unlimited – Releasable to PFP Nations Empowering HF systems with cognitive wideband radio capabilities", Thales -communications & security, Dec. 31, 2014 (Dec. 31, 2014), XP055749192, Retrieved from the Internet: URL:http://lamyc.free.fr/publications/IST123-2014.pdf [retrieved on Nov. 11, 2020].

Bergzen H: "A proposed scheme for synchronous MIL-STD/FED-STD ALE", HF Radio Systems and Techniques, Seventh International Conference on ( Conf. Publ. No. 441) Nottingham, UK Jul. 7-10, 1997, London, UK,IEE, UK, Jul. 7, 1997 (Jul. 7, 1997), pp. 242-245, XP006508153, DOI: 10.1049/CP:19970797 ISBN: 978-0-85296-688-4 * the whole document *.

* cited by examiner

HIGH FREQUENCY RADIO INCLUDING AN ADJUSTABLE-BANDWIDTH TUNABLE BANDPASS FILTER FOR IMPROVED DETECTION OF INCOMING CALLS AND METHODS FOR PROCESSING INCOMING CALLS

TECHNICAL FIELD

The invention relates to a high frequency (HF) radio including an adjustable-bandwidth tunable bandpass filter for improved detection of incoming calls and methods for processing incoming calls.

BACKGROUND

High frequency (HF) radio stations are configured to perform long-distance ionospheric radio communications at frequencies within the HF band. However, a range of frequencies over which a HF radio station can perform ionospheric radio communications varies over time due to changes over time in ionospheric propagation conditions and interfering HF communications. In view of the foregoing, a HF radio station cannot listen for calls at a fixed, unchanging frequency, but rather must listen for calls at varying frequencies (i.e., channels) within the HF band.

An approach for listening for calls by a HF radio station is known as Automatic Link Establishment (ALE). Under this approach, a plurality of ALE channels that are known to be suitable for ionospheric radio communications are assigned to HF radio stations in a HF radio network for linking between the HF radio stations in the network. However, only a subset of the assigned ALE channels are suitable for linking at any given time, due to changes over time in ionospheric propagation conditions and interfering HF communications.

One technique for ensuring that HF radio stations can detect incoming calls at all times is known as scanning ALE. Using this technique, each HF radio station in a HF radio network continuously scans through assigned ALE channels until it detects a possibility of an incoming call from a calling HF radio station. A drawback of this technique is the delay in link establishment between a calling HF radio station and a called HF radio station, since the called HF radio station generally is not monitoring the ALE channel along which the calling HF radio station wishes to transmit, and since the calling HF radio station is generally not aware if the ALE channel along which it wishes to transmit is occupied. This is problematic when HF radio communications are used in environments in which link establishment time is critical.

A technique for significantly reducing the time required for link establishment is known as staring ALE. According to this technique, each HF radio station in a staring ALE network has a plurality of parallel receivers configured to continuously monitor a plurality of ALE channels within the HF band for calling signals, the plurality of ALE channels being assigned to the respective HF radio station. The problem with this approach is that the HF radio stations are exposed to strong interfering HF signals throughout the HF band that make it difficult for the HF radio stations to detect faint calls, thereby complicating or preventing the detection of at least some calling signals.

There is thus a need in the art for a HF radio station in a staring ALE network with an improved capability for detecting calling signals, while maintaining the fast link establishment that characterizes the staring ALE technique.

References considered to be relevant as background to the presently disclosed subject matter are listed below. Acknowledgement of the references herein is not to be inferred as meaning that these are in any way relevant to the patentability of the presently disclosed subject matter.

Eric E. Johnson, "Staring Link Establishment for High-Frequency Radio", MILCOM 2015-2015 IEEE Military Communications Conference, pages 1433-1438, investigates the possibility and advantages of using various non-scanning ALE techniques with a new wideband ALE (WALE) to improve spectrum awareness and linking speed.

Andree Bengtsson, "Instantaneous Channel Access for 3G-ALE Systems", published on Aug. 31, 2014, discloses removing a need for a scanning mechanism for radio systems that use a 3G-ALE standard while retaining the capability to handle multiple channels, thereby decreasing latency. This can be accomplished by using a parallel receiver that receives on all the channels in the channel group.

Chinese Patent Application Publication No. 101567674A, published on Oct. 28, 2009, discloses a tunable bandpass filter, which adopts a method of the combination of left-handed and right-handed non-linear transmission lines, wherein the left-handed non-linear transmission line consists of a series varactor and a shunt inductor, and has high-pass characteristic; and the right-handed non-linear transmission line consists of a series inductor and parallel varactor, and has low-pass characteristic. The capacitances of the varactors are changed by controlling the bias voltages of the varactors of the left-handed and right-handed non-linear transmission lines so as to adjust lower and upper side frequencies of the bandpass filter respectively.

Saha et al., "Tunable Band-Pass Filter Using RF MEMS Capacitance and Transmission Line, Progress In Electromagnetics Research C, Vol. 23, pages 233-247, 2011, presents the design and fabrication of an RF MEMS tunable band-pass filter. The band-pass filter design uses both distributed transmission lines and RF MEMS capacitances together to replace the lumped elements. The use of RF MEMS variable capacitances gives the flexibility of tuning both the centre frequency and the band-width of the band-pass filter. A prototype of the tunable band-pass filter is realized using parallel plate capacitances. The variable shunt and series capacitances are formed by a combination of parallel plate RF MEMS shunt bridges and series cantilevers. The filter operates at C-X band. The measurement results agree well with the simulation results.

GENERAL DESCRIPTION

In accordance with a first aspect of the presently disclosed subject matter, there is provided a high frequency (HF) radio configured to process an incoming call from another HF radio, the HF radio comprising: a plurality of receivers configured to simultaneously monitor a corresponding plurality of assigned Automatic Link Establishment (ALE) channels within a staring frequency band for one or more digital calling signals that are indicative of incoming calls, wherein the staring frequency band is a subset of a HF band, and wherein a bandwidth of the staring frequency band is adjustable; an adjustable-bandwidth tunable bandpass filter configured to obtain, from at least one antenna, first HF signals within a HF band, and to provide only second HF signals within the staring frequency band, the second HF signals including one or more analog calling signals that are indicative of the incoming calls; a first receive path connected to an output of the adjustable-bandwidth tunable bandpass filter and configured to convert the analog calling signals to the digital calling signals; and a controller configured to: establish a communication link between the HF radio and the another HF radio, in response to a given receiver of the receivers decoding a given digital calling signal of the digital calling signals that is indicative of the incoming call from the another HF radio, the given digital calling signal being communicated from the another HF radio over a given assigned ALE channel of the assigned ALE channels; and select the staring frequency band and the assigned ALE channels.

In some cases, the adjustable-bandwidth tunable bandpass filter comprises an adjustable high pass filter (HPF) and an adjustable low pass filter (LPF) connected in series, and wherein the controller is configured to select the staring frequency band by independently adjusting a first cut-off frequency of the HPF and a second cut-off frequency of the LPF.

In some cases, the controller is configured to select the staring frequency band and the assigned ALE channels, based on values of parameters that are indicative of ionospheric propagation conditions at a given time.

In some cases, the given time is a current time. In some cases, the parameters include one or more of: a calendar date, a time of day at a geographical location of the HF radio, a time of day at a geographical location of the another HF radio, a geographical location of the HF radio, a geographical location of the another HF radio, or a distance between the HF radio and the another HF radio.

In some cases, the controller is configured to select the staring frequency band and the assigned ALE channels based on an analysis of a quality of signal reception over ALE channels at a plurality of times in the past, the analysis being indicative of a relationship between the parameters and the ionospheric propagation conditions.

In some cases, the controller is configured to select the staring frequency band and the assigned ALE channels to prevent one or more expected interfering HF signals from being included within the staring frequency band.

In some cases, the controller is configured to select the staring frequency band and the assigned ALE channels based on an analysis of a quality of signal reception over ALE channels at a plurality of times in the past, the analysis being indicative of the expected interfering HF signals.

In some cases, the controller is configured to narrow the staring frequency band to prevent one or more actual interfering HF signals from being included within the staring frequency band.

In some cases, the first receive path comprises: a first amplification circuit coupled to an output of the adjustable-bandwidth tunable bandpass filter and configured to generate amplified calling signals based on the analog calling signals; and a first analog-to-digital converter (ADC) connected to an output of the first amplification circuit and configured to convert the amplified calling signals to the digital calling signals.

In some cases, the first receive path further comprises: a low-noise amplifier (LNA) connected to an output of the adjustable-bandwidth tunable bandpass filter and configured to amplify the analog calling signals to generate modified calling signals; wherein the first amplification circuit is coupled to an output of the LNA and is configured to generate the amplified calling signals based on the modified calling signals.

In some cases, the first receive path further comprises: a radio frequency (RF) splitter coupled to an output of the adjustable-bandwidth tunable bandpass filter and configured to generate split calling signals based on the analog calling signals; wherein the first amplification circuit is connected to an output of the RF splitter and is configured to amplify the split calling signals to generate the amplified calling signals.

In some cases, upon establishment of the communication link between the HF radio and the another HF radio, the adjustable-bandwidth tunable bandpass filter is configured to obtain one or more analog data traffic signals from the another HF radio over the given assigned ALE channel.

In some cases, the HF radio further comprises: a second receive path connected to an output of the adjustable-bandwidth tunable bandpass filter and configured to obtain the analog data traffic signals therefrom, the second receive path being further configured to convert the analog data traffic signals to digital data traffic signals; wherein the plurality of receivers are connected to the second receive path; and wherein the given receiver is configured to decode the digital data traffic signals.

In some cases, the second receive path comprises: a radio frequency (RF) splitter coupled to an output of the adjustable-bandwidth tunable bandpass filter and configured to generate split data traffic signals based on the analog data traffic signals; a second amplification circuit coupled to an output of the RF splitter and configured to amplify the split data traffic signals to generate amplified data traffic signals; and a second ADC connected to an output of the second amplification circuit and configured to convert the amplified data traffic signals to the digital data traffic signals.

In some cases, the first amplification circuit has a lower gain and signal-to-noise ratio than the second amplification circuit and a higher selectivity than the second amplification circuit.

In some cases, the plurality of receivers are configured to decode the digital calling signals concurrently with the given receiver decoding the digital data traffic signals.

In some cases, the controller is configured to narrow the staring frequency band, in response to the given receiver decoding the given digital calling signal.

In some cases, the staring frequency band is narrowed such that a first passband of the staring frequency band is identical to a second passband of the given assigned ALE channel.

In some cases, the first receive path is configured to obtain the analog data traffic signals from the adjustable-bandwidth tunable bandpass filter, and to convert the analog data traffic signals into digital data traffic signals; wherein the given receiver is configured to decode the digital data traffic signals.

In some cases, the first receive path further comprises: a low-noise amplifier (LNA) connected to an output of the adjustable-bandwidth tunable bandpass filter and configured to amplify the analog data traffic signals to generate modified data traffic signals; wherein the first amplification circuit is connected to an output of the LNA and is configured to amplify the modified data traffic signals to generate amplified data traffic signals; and wherein the first ADC is configured to convert the amplified data traffic signals to the digital data traffic signals.

In accordance with a second aspect of the presently disclosed subject matter, there is provided a method for a high frequency (HF) radio to process an incoming call from another HF radio, the method comprising: selecting a staring frequency band and a plurality of assigned Automatic Link Establishment (ALE) channels within the staring frequency band; obtaining, at an adjustable-bandwidth tunable bandpass filter, from at least one antenna, first HF signals within a HF band; providing, by the adjustable-bandwidth tunable bandpass filter, only second HF signals within the staring frequency band, the second HF signals including one or more analog calling signals that are indicative of incoming calls, wherein the staring frequency band is a subset of the HF band, and wherein a bandwidth of the staring frequency band is adjustable; converting the analog calling signals to one or more digital calling signals that are indicative of the incoming calls, by a first receive path connected to an output of the adjustable-bandwidth tunable bandpass filter; monitoring, by a plurality of receivers, the ALE channels, each receiver of the receivers being configured to monitor a different assigned ALE channel of the assigned ALE channels for the digital calling signals; and establishing a communication link between the HF radio and the another HF radio, in response to a given receiver of the receivers decoding a given digital calling signal of the digital calling signals that is indicative of the incoming call from the another HF radio, the given digital calling signal being communicated from the another HF radio over a given assigned ALE channel of the assigned ALE channels.

In some cases, the adjustable-bandwidth tunable bandpass filter comprises an adjustable high pass filter (HPF) and an adjustable low pass filter (LPF) connected in series, and selecting the staring frequency band comprises: independently adjusting a first cut-off frequency of the HPF and a second cut-off frequency of the LPF.

In some cases, the staring frequency band and the assigned ALE channels are selected based on values of parameters that are indicative of ionospheric propagation conditions at a given time.

In some cases, the given time is a current time. In some cases, the parameters include one or more of: a calendar date, a time of day at a geographical location of the HF radio, a time of day at a geographical location of the another HF radio, a geographical location of the HF radio, a geographical location of the another HF radio, or a distance between the HF radio and the another HF radio.

In some cases, the staring frequency band and the assigned ALE channels are selected based on an analysis of a quality of signal reception over ALE channels at a plurality of times in the past, the analysis being indicative of a relationship between the parameters and the ionospheric propagation conditions.

In some cases, the staring frequency band and the assigned ALE channels are selected to prevent one or more expected interfering HF signals from being included within the staring frequency band.

In some cases, the staring frequency band and the assigned ALE channels are selected based on an analysis of a quality of signal reception over ALE channels at a plurality of times in the past, the analysis being indicative of the expected interfering HF signals.

In some cases, the method further comprises: narrowing the staring frequency band to prevent one or more actual interfering HF signals from being included within the staring frequency band.

In some cases, converting the analog calling signals to the digital calling signals comprises: generating amplified calling signals, by a first amplification circuit coupled to an output of the adjustable-bandwidth tunable bandpass filter, based on the analog calling signals; and converting the amplified calling signals to the digital calling signals, by a first analog-to-digital converter (ADC) connected to an output of the first amplification circuit.

In some cases, generating the amplified calling signals comprises: amplifying the analog calling signals, by a low-noise amplifier (LNA) connected to an output of the adjustable-bandwidth tunable bandpass filter, to generate modified calling signals; and generating the amplified calling signals based on the modified calling signals.

In some cases, generating the amplified calling signals comprises: generating split calling signals based on the analog calling signals, by a radio frequency (RF) splitter coupled to an output of the adjustable-bandwidth tunable bandpass filter; and amplifying the split calling signals, by the first amplification circuit, to generate the amplified calling signals.

In some cases, upon establishment of the communication link between the HF radio and the another HF radio, the obtaining includes obtaining one or more analog data traffic signals from the another HF radio, the analog data traffic signals being communicated from the another HF radio over the given assigned ALE channel.

In some cases, the method further comprises: obtaining the analog data traffic signals at a second receive path, being connected to an output of the adjustable-bandwidth tunable bandpass filter; converting the analog data traffic signals to digital data traffic signals, by the second receive path; and decoding the digital data traffic signals, by the given receiver.

In some cases, converting the analog data traffic signals to digital data traffic signals comprises: generating split data traffic signals, by a radio frequency (RF) splitter coupled to an output of the adjustable-bandwidth tunable bandpass filter, based on the analog data traffic signals; amplifying the split data traffic signals, by a second amplification circuit coupled to an output of the RF splitter, to generate amplified data traffic signals; and converting the amplified data traffic signals to the digital data traffic signals, by a second ADC connected to the second amplification circuit.

In some cases, the first amplification circuit has a lower gain and signal-to-noise ratio than the second amplification circuit and a higher selectivity than the second amplification circuit.

In some cases, the method further comprises: decoding the digital calling signals, by the receivers, concurrently with the decoding of the digital data traffic signals.

In some cases, the method further comprises: narrowing the staring frequency band, in response to the decoding of the given digital calling signal.

In some cases, the staring frequency band is narrowed such that a first passband of the staring frequency band is identical to a second passband of the given assigned ALE channel.

In some cases, the method further comprises: obtaining the analog data traffic signals at the first receive path; converting the analog data traffic signals to digital data traffic signals, by the first receive path; and decoding the digital data traffic signals, by the given receiver.

In some cases, converting the analog data traffic signals to digital data traffic signals comprises: amplifying the analog data traffic signals, by a low-noise amplifier (LNA) connected to an output of the adjustable-bandwidth tunable bandpass filter, to generate modified data traffic signals; amplifying the modified data traffic signals, by the first amplification circuit, to generate amplified data traffic signals; and converting the amplified data traffic signals to the digital data traffic signals, by the first ADC.

In accordance with a third aspect of the presently disclosed subject matter, there is provided a non-transitory computer readable storage medium having computer readable program code embodied therewith, the computer readable program code, executable by at least one processor of a computer to perform a method for a high frequency (HF)

radio to process an incoming call from another HF radio, the method comprising: selecting a staring frequency band and a plurality of assigned Automatic Link Establishment (ALE) channels within the staring frequency band; obtaining, at an adjustable-bandwidth tunable bandpass filter, from at least one antenna, first HF signals within a HF band; providing, by the adjustable-bandwidth tunable bandpass filter, only second HF signals within the staring frequency band, the second HF signals including one or more analog calling signals that are indicative of incoming calls, wherein the staring frequency band is a subset of the HF band, and wherein a bandwidth of the staring frequency band is adjustable; converting the analog calling signals to one or more digital calling signals that are indicative of the incoming calls, by a first receive path connected to an output of the adjustable-bandwidth tunable bandpass filter; monitoring, by a plurality of receivers, the ALE channels, each receiver of the receivers being configured to monitor a different assigned ALE channel of the assigned ALE channels for the digital calling signals; and establishing a communication link between the HF radio and the another HF radio, in response to a given receiver of the receivers decoding a given digital calling signal of the digital calling signals that is indicative of the incoming call from the another HF radio, the given digital calling signal being communicated from the another HF radio over a given assigned ALE channel of the assigned ALE channels.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
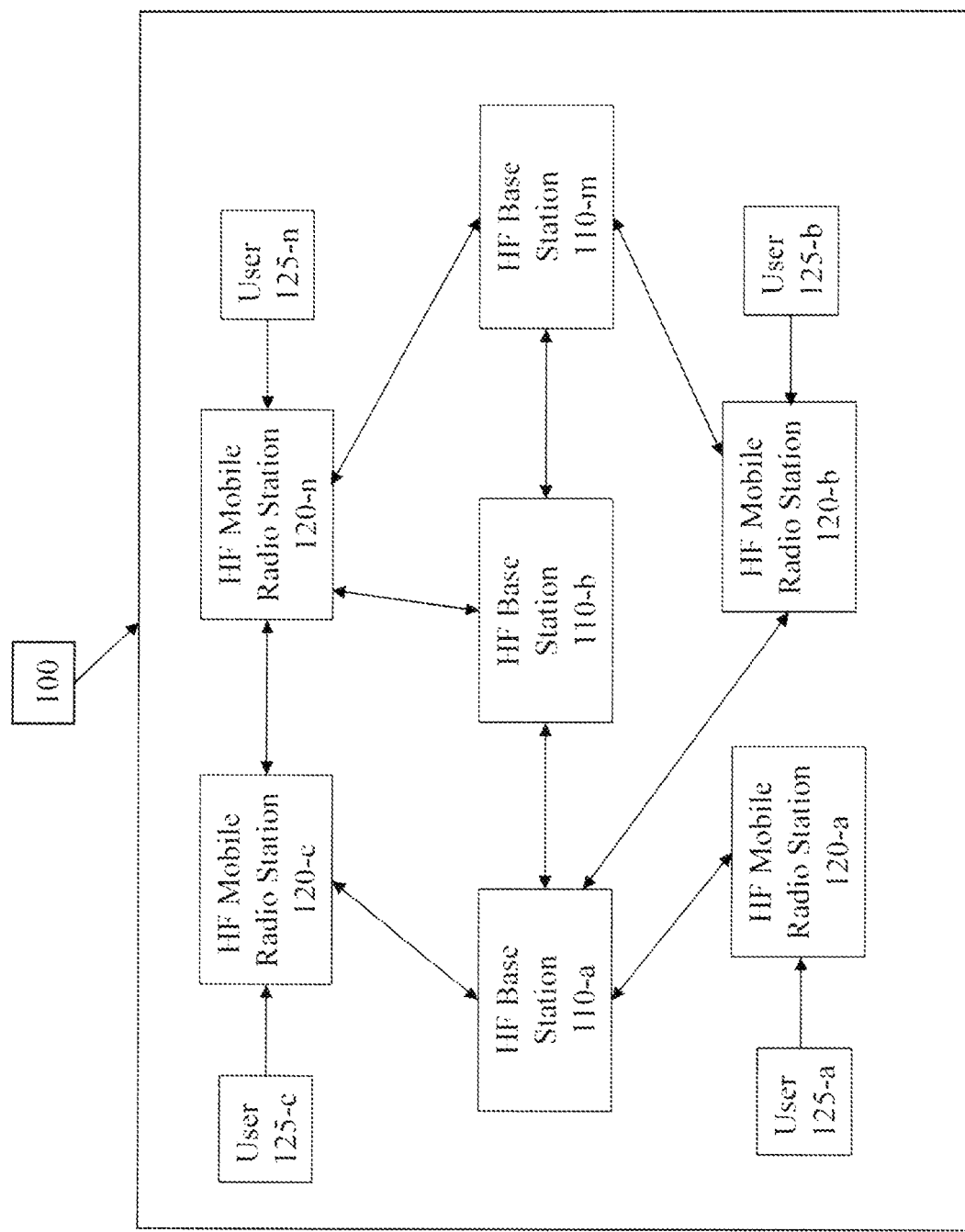
FIG. 1 is a schematic illustration of the operation of a staring Automatic Link Establishment (ALE) network, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "passing", "converting", "demodulating", "monitoring", "selecting", "establishing", "amplifying", "reducing", "splitting", "tuning" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
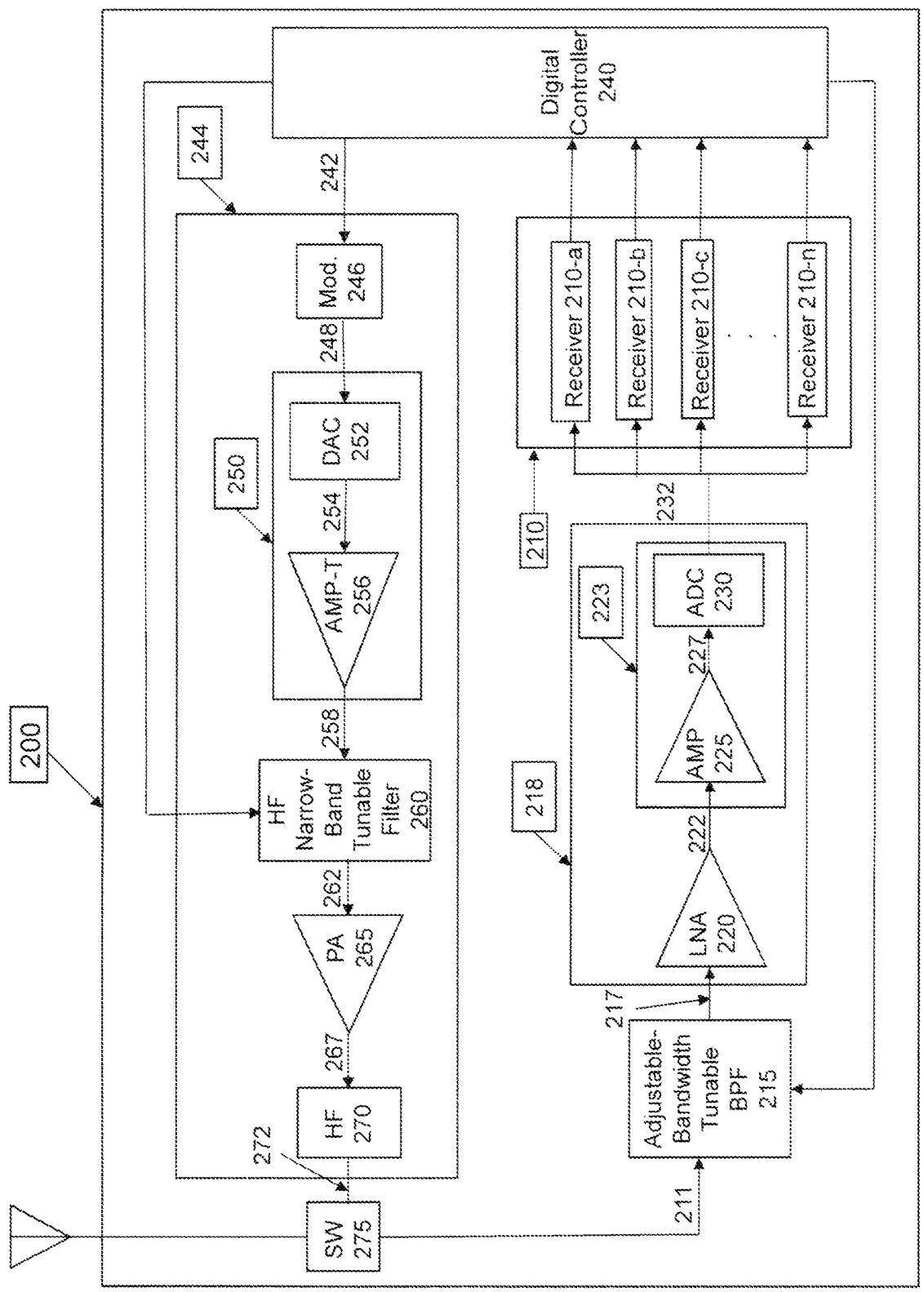
FIG. 2 is a block diagram schematically illustrating an example of a first transceiver for a high frequency (HF) radio station in a staring ALE network, in accordance with the presently disclosed subject matter.

In embodiments of the presently disclosed subject matter, fewer, more and/or different stages than those shown in FIGS. 3, 4, 6 and 7 may be executed. In embodiments of the presently disclosed subject matter one or more stages illustrated in FIGS. 3, 4, 6 and 7 may be executed in a different order and/or one or more groups of stages may be executed simultaneously. FIGS. 1, 2 and 5 illustrate general schematics of the architecture of a HF radio station in accordance with embodiments of the presently disclosed subject matter. Each module in FIGS. 1, 2 and 5 can be made up of any combination of software, hardware and/or firmware that performs the functions as defined and explained herein. The modules in FIGS. 1, 2 and 5 may be centralized in one location or dispersed over more than one location. In other embodiments of the presently disclosed subject matter, the system may comprise fewer, more, and/or different modules than those shown in FIGS. 1, 2 and 5.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a schematic illustration of the operation of a staring Automatic Link Establishment (ALE) network 100, in accordance with the presently disclosed subject matter.

In accordance with the presently disclosed subject matter, staring ALE network 100 can be configured to include one or more HF base stations 110 (e.g., HF base station 110-*a*, HF base station 110-*b*, . . . , HF base station 110-*m*) and one or more HF mobile radio stations 120 (e.g., HF mobile radio station 120-*a*, HF mobile radio station 120-*b*, HF mobile radio station 120-*c*, . . . , HF mobile radio station 120-*n*). Each HF mobile radio station 120 can be configured to be capable of two-way communications with one or more of the HF base stations 110. In some cases, at least some of the HF base stations 110 can be connected to one another, as shown in FIG. 1. In some cases, given HF mobile radio stations 120 can be configured to be capable of direct (i.e., not via a HF base station 110) two-way communications with one another (e.g., HF mobile radio stations 120-*c* and 120-*n*). In some cases, HF mobile radio stations 120 can be configured to be capable of two-way communications with one another via one or more HF base stations 110. For example, HF mobile radio station 120-*c* can be configured to be capable of two-way communications with HF mobile radio station 120-*a* by way of HF base station 110-*a*. As an additional example, HF mobile radio station 120-*n* can be configured to be capable of two-way communications with HF mobile radio station 120-*a* by way of HF base station 110-*b* and HF base station 110-*a*. Each user (e.g., user 125-*a*, user 125-*b*, user 125-*c*, . . . , user 125-*n*) of a respective HF mobile radio station (e.g., 120-*a*, 120-*b*, 120-*c*, . . . , 120-*n*) can instruct its respective HF mobile radio station 120 to transmit data traffic to another HF mobile radio station 120.

Each HF base station 110 and each HF mobile radio station 120 can be configured to include a transceiver, the transceiver including a transmit path and at least one receive path, as detailed further herein, inter alia with reference to FIGS. 2 and 5. The transceiver of each HF base station 110 and each HF mobile radio station 120 can be configured to monitor a plurality of ALE channels assigned for use in the staring ALE network 100 (hereinafter, assigned ALE channels) and to transmit over those ALE channels.

Attention is now drawn to FIG. 2, a schematic illustration of an example of a first 10 transceiver 200 for a high frequency (HF) radio station (e.g., a HF mobile radio station 120, a HF base station 110) in a staring ALE network 100, in accordance with the presently disclosed subject matter.

In accordance with the presently disclosed subject matter, the first transceiver 200 can be configured to include a staring receiver 210. The staring receiver 210 can be configured to include a plurality of parallel receivers (e.g., receiver 210-*a*, receiver 210-*b*, receiver 210-*c*, . . . , receiver 210-*n*). The plurality of parallel receivers (e.g., 210-*a*, 210-*b*, 210-*c*, . . . , 210-*n*) can be configured to simultaneously monitor a corresponding plurality of assigned ALE channels within a staring frequency band for one or more digital control signals, including, inter alia, one or more digital calling signals that are indicative of a corresponding one or more incoming calls to the HF radio station. Each receiver (e.g., 210-*a*, 210-*b*, 210-*c*, . . . , 210-*n*) of the staring receiver 210 can be configured to decode digital HF signals, whether digital control signals or digital data traffic signals, that are received by the first transceiver 200 along an assigned ALE channel that is monitored by the respective receiver.

First transceiver 200 can be further configured to include a digital controller 240. Digital controller 240 can be one or more processing units (e.g. central processing units), microprocessors, microcontrollers (e.g. microcontroller units (MCUs)) or any other computing devices or modules, including multiple and/or parallel and/or distributed processing units.

Digital controller 240 can be configured to select the staring frequency band and the assigned ALE channels. The staring frequency band can be a subset of the HF band, the HF band being defined in the present disclosure as the range of radio frequency signals between 1.5 MHz and 30 MHz. The staring frequency band can be selected to improve a detection of incoming calls by the HF radio due to the filtering out of interfering HF signals, while maintaining the fast link establishment that characterizes a HF radio in a staring ALE network 100.

In some cases, the staring frequency band and the assigned ALE channels can be selected, at least in part, based on values of parameters that are indicative of ionospheric propagation conditions at a given time, as detailed further herein, inter alia with reference to FIG. 5.

In some cases, the staring frequency band and the assigned ALE channels can be selected, at least in part, to prevent one or more expected interfering HF signals from being included within the staring frequency band, as detailed further herein, inter alia with reference to FIG. 5.

In some cases, digital controller 240 can be configured to narrow the staring frequency band to prevent one or more actual interfering HF signals from being included within the staring frequency band.

First transceiver 200 can be configured to include an adjustable-bandwidth tunable bandpass filter 215. Adjustable-bandwidth tunable bandpass filter 215 can be configured to obtain, from (e.g., via) at least one antenna connected to first transceiver 200, one or more first HF signals 211 within the HF band. Adjustable-bandwidth tunable bandpass filter 215 can be further configured to provide only one or more second HF signals 217 within the staring frequency band. The adjustable-bandwidth tunable bandpass filter 215 can be configured to obtain the first HF signals 211 via a receiver/transmitter (RX/TX) switch 275 connected to the at least one antenna.

Adjustable-bandwidth tunable bandpass filter 215 can be configured to comprise an adjustable high pass filter (HPF) and an adjustable low pass filter (LPF) connected in series (not shown), wherein the first cut-off frequency of the HPF and the second cut-off frequency of the LPF are configured to be independently adjustable (not shown). This enables the bandwidth of the staring frequency band to be adjusted. The staring frequency band can be adjusted to be between 4% and 100% of the HF band. In some cases, the first cut-off frequency can be one of the following frequencies: 1.5 MHz, 2.43 MHz, 3.7 MHz, 5.6 MHz, 8.5 MHz, 13 MHz and 19.8 MHz. In some cases, the second cut-off frequency can be one of the following frequencies: 2.43 MHz, 3.7 MHz, 5.6 MHz, 8.5 MHz, 13 MHz, 19.8 MHz and 30 MHz.

Digital controller 240 can be configured to select the staring frequency band by independently adjusting the first cut-off frequency of the HPF of the adjustable-bandwidth tunable bandpass filter 215 and the second cut-off frequency of the LPF of the adjustable-bandwidth tunable bandpass filter 215.

First transceiver 200 can be configured to include a first receive path 218. First receive path 218 can be configured to convert the second HF signals 217 to one or more first digital HF signals 232 obtained by the staring receiver 210. In some cases, the second HF signals 217 can include a given analog calling signal that is received from another HF radio station (i.e., a calling HF radio station), and the first receive path 218 can be configured to convert the given analog calling signal to a given digital calling signal, as detailed further herein, inter alia with reference to FIG. 3. In some cases, the second HF signals 217 can include one or more analog data traffic signals that are received from another HF radio station (i.e., a calling HF radio station), and the first receive path 218 can be configured to convert the analog data traffic signals to one or more digital data traffic signals, as detailed further herein, inter alia with reference to FIG. 4.

First receive path 218 can be configured to include, optionally, a low-noise amplifier (LNA) 220. In addition, first receive path 218 can be configured to include a first receive path conversion circuit 223.

LNA 220 can be configured to amplify the second HF signals 217 to generate one or more modified HF signals 222. In some cases, LNA 220 can be provided prior to adjustable-bandwidth tunable bandpass filter 215.

First receive path conversion circuit 223 can be configured to include a first amplification circuit (AMP) 225, comprising one or more amplifiers, and a first analog-to-digital converter (ADC) 230. First amplification circuit 225 can be configured to amplify the modified HF signals 222 or the second HF signals 217 to generate one or more first amplified HF signals 227. First ADC 230 can be configured to convert the first amplified HF signals 227 to the first digital HF signals 232.

First transceiver 200 can be further configured to include a transmit path 244 for the transmission of HF signals to other HF radio stations. Transmit path 244 can be configured to include a modulator 246, a transmitter conversion circuit 250, a power amplifier (PA) 265, and a harmonic filter 270. In addition, transmit path 244 can be configured to include, optionally, a HF narrowband tunable bandpass filter 260 coupled between transmitter conversion circuit 250 and power amplifier (PA) 265.

Digital controller 240 can be configured to provide, to the modulator 246, one or more digital baseband signals 242 comprising information to be transmitted to another HF radio station (not shown).

Modulator 246 can be configured to digitally modulate the digital baseband signals 242, thereby generating one or more digital HF transmission signals 248 having a frequency associated with a given assigned ALE channel of the assigned ALE channels of the HF radio station.

Transmitter conversion circuit 250 can be configured to convert the digital HF transmission signals 248 to one or more modified analog HF transmission signals 258. In some cases, transmitter conversion circuit 250 can be configured to include a digital-to-analog converter (DAC) 252 and a transmitter amplifier (AMP-T) 256. DAC 252 can be configured to convert the digital HF transmission signals 248 to one or more analog HF transmission signals 254. Transmitter amplifier 256 can be configured to amplify the analog HF transmission signals 254 to generate the modified analog HF transmission signals 258.

HF narrowband tunable bandpass filter 260 can be configured to pass only HF signals that are transmitted along the given assigned ALE channel. As a result, HF narrowband tunable bandpass filter 260 can be configured to pass the information that is to be transmitted to the another HF radio station while rejecting noise that is present in the modified analog HF transmission signals 258, thereby generating one or more noise-compensated HF transmission signals 262. Digital controller 240 can be configured to tune the HF narrowband tunable bandpass filter 260 to pass only HF signals that are transmitted along the given assigned ALE channel.

Power amplifier 265 can be configured to amplify the noise-compensated HF transmission signals 262 or the modified analog HF transmission signals 258 to generate one or more amplified HF transmission signals 267 having enough power to be transmitted to the another HF radio station, via the at least one antenna.

Harmonic filter 270 can be configured to reduce harmonics that are present in the amplified HF transmission signals 267 to tolerable levels, thereby generating one or more compensated amplified HF transmission signals 272.

The compensated amplified HF transmission signals 272 can be provided to the at least one antenna for transmission thereof, via RX/TX switch 275. RX/TX switch 275 can also be configured to include an antenna coupler (not shown) to increase the power of the compensated amplified HF transmission signals 272.

Figure 3:
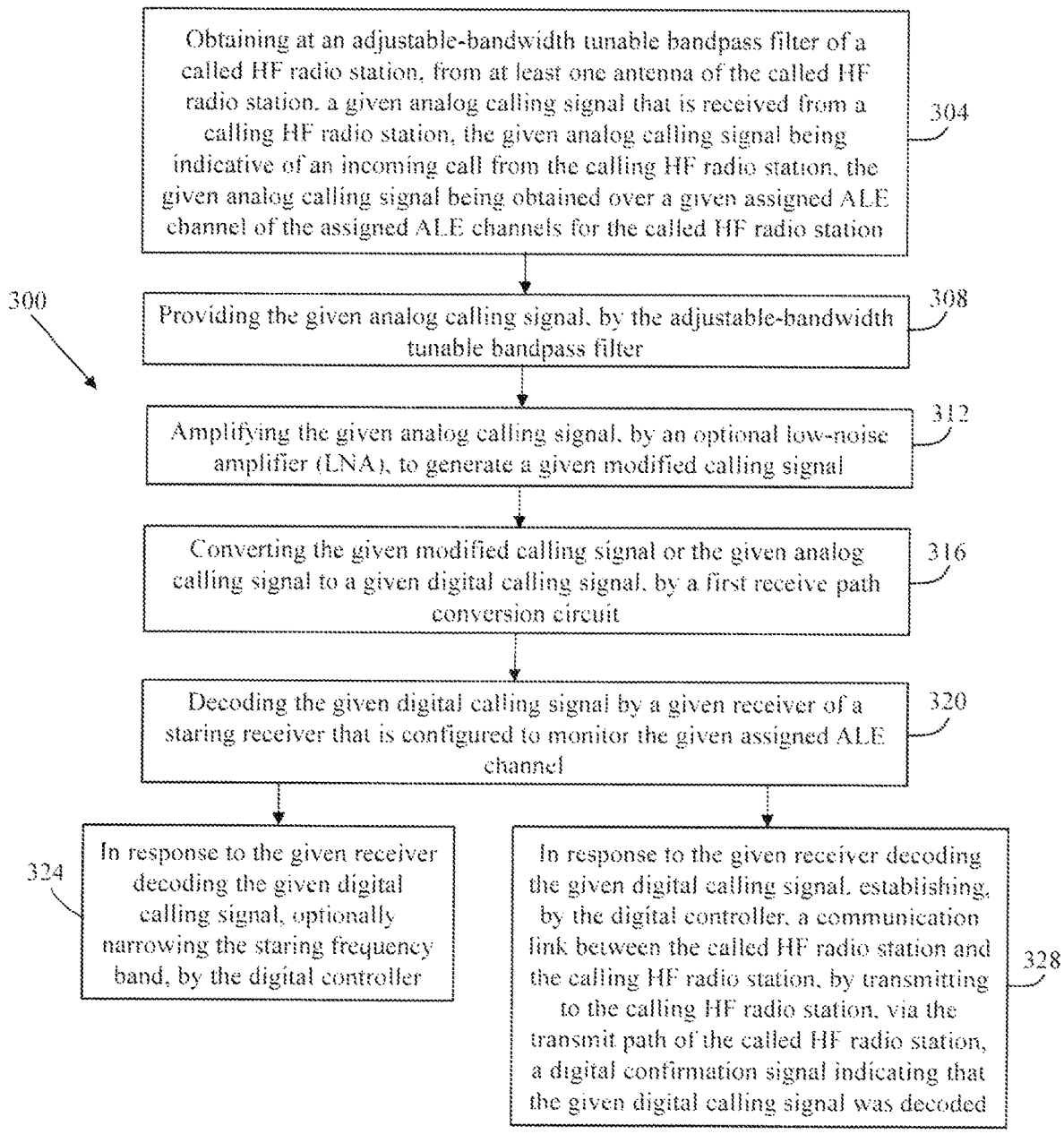
FIG. 3 is a flowchart illustrating an example of a method for a called HF radio station to establish a communication link with a calling HF radio station using the first transceiver schematically illustrated in FIG. 2, in accordance with the presently disclosed subject matter.

Attention is now drawn to FIG. 3, a flowchart illustrating an example of a method 300 for a called HF radio station to establish a communication link with a calling HF radio station using the first transceiver 200 schematically illustrated in FIG. 2, in accordance with the presently disclosed subject matter.

In accordance with the presently disclosed subject matter, an adjustable-bandwidth tunable bandpass filter 215 of the called HF radio station can be configured to obtain, from (e.g., via) at least one antenna of the called HF radio station, a given analog calling signal that is received from a calling HF radio station, the given analog calling signal being indicative of an incoming call from the calling HF radio station (block 304). The given analog calling signal can be obtained over a given assigned ALE channel of the assigned ALE channels for the called HF radio station.

Adjustable-bandwidth tunable bandpass filter 215 can be further configured to provide the given analog calling signal (block 308).

Optional low-noise amplifier (LNA) 220 can be configured to amplify the given analog calling signal to generate a given modified calling signal (block 312).

First receive path conversion circuit 223 can be configured to convert the given modified calling signal or the given analog calling signal to a given digital calling signal (block 316).

A given receiver (e.g., 210-*a*, 210-*b*, 210-*c*, . . . , 210-*n*), configured to monitor the given assigned ALE channel, can be configured to decode the given digital calling signal (block 320).

In response to the given receiver (e.g., 210-*a*, 210-*b*, 210-*c*, . . . , 210-*n*) decoding the given digital calling signal, the digital controller 240 can be configured, optionally, to narrow the staring frequency band (block 324). In some cases, the staring frequency band can be narrowed to have a passband that is identical to a passband of the given assigned ALE channel over which the given digital calling signal is obtained. By narrowing the staring frequency band, staring receiver 210 can be configured to obtain one or more digital data traffic signals along the given assigned ALE channel from the calling HF radio station, as detailed further herein, inter alia with reference to FIG. 4, while filtering out at least some of the interfering HF signals obtained by first transceiver 200 not along the given assigned ALE channel.

Moreover, in response to the given receiver (e.g., 210-*a*, 210-*b*, 210-*c*, . . . , 210-*n*) decoding the given digital calling signal, the digital controller 240 can be configured to establish a communication link between the called HF radio station and the calling HF radio station by transmitting to the calling HF radio station, via transmit path 244 of the called HF radio station, a digital confirmation signal indicating that the given digital calling signal was decoded (block 328). The specifics of transmit path 244 are detailed earlier herein, inter alia with reference to FIG. 2.

Figure 4:
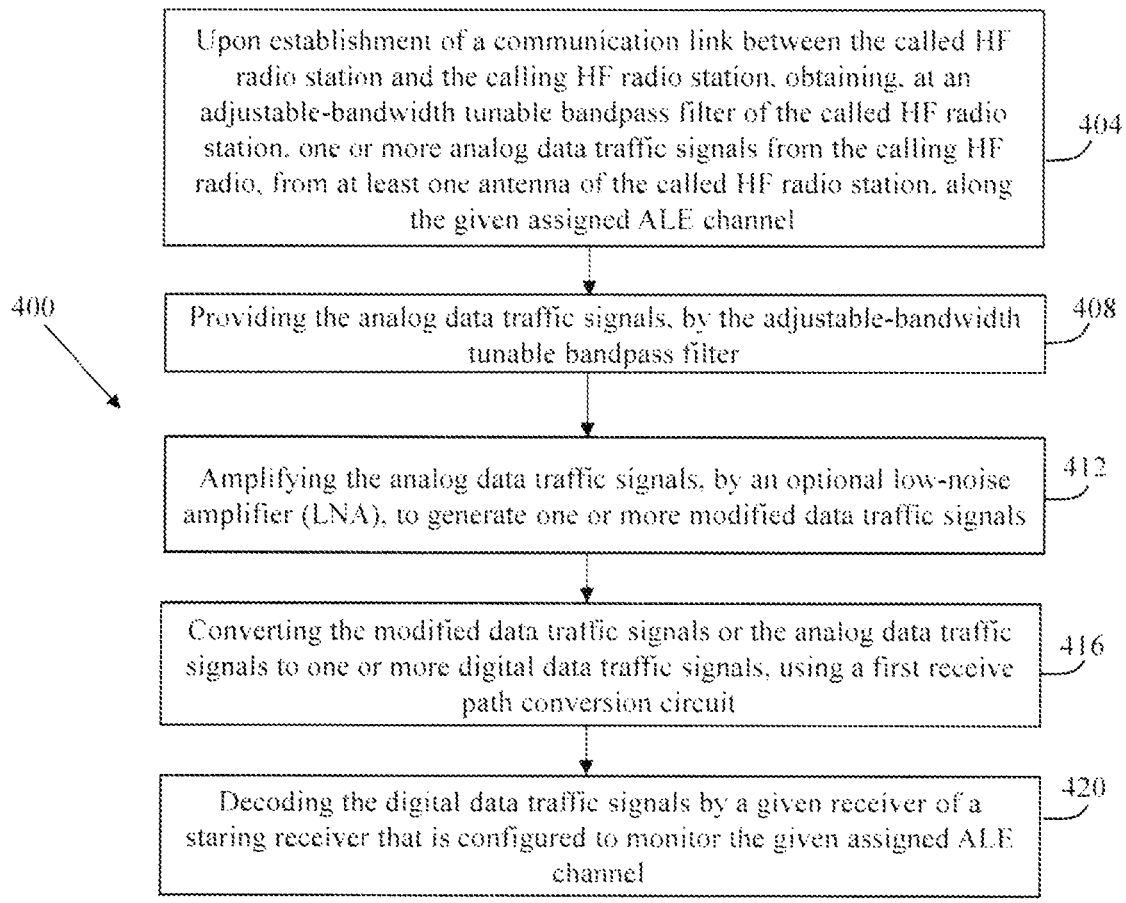
FIG. 4 is a flowchart illustrating an example of a method for a called HF radio station to decode data traffic signals received from a calling HF radio station using the first transceiver schematically illustrated in FIG. 2, in accordance with the presently disclosed subject matter.
Figure 5:
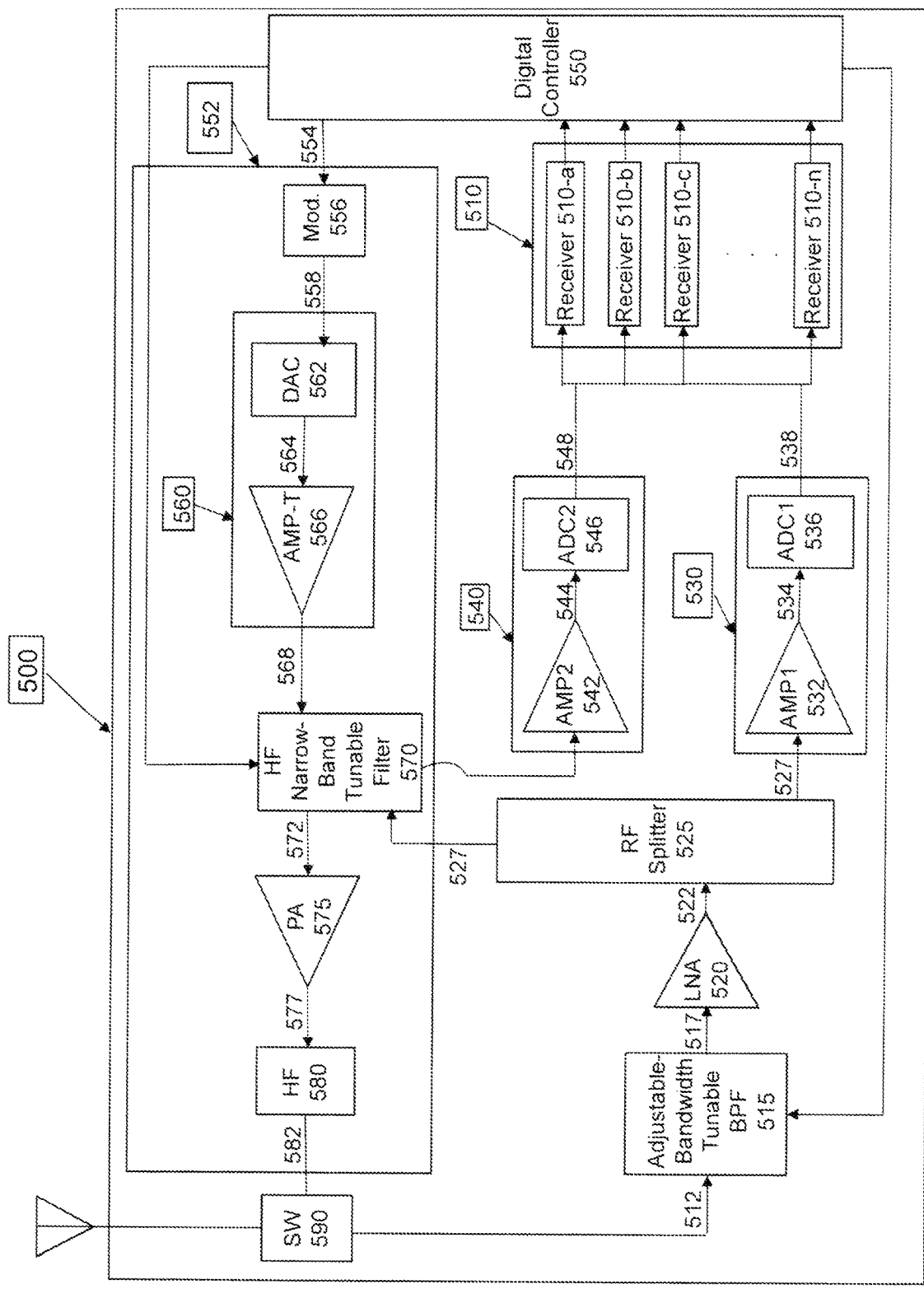
FIG. 5 is a block diagram schematically illustrating an example of a second transceiver for a HF radio station in a staring ALE network, in accordance with the presently disclosed subject matter.

Attention is now drawn to FIG. 4, a flowchart illustrating an example of a method 400 for a called HF radio station to decode data traffic signals received from a calling HF radio station using the first transceiver 200 schematically illustrated in FIG. 2, in accordance with the presently disclosed subject matter.

In accordance with the presently disclosed subject matter, upon establishment of a communication link between the called HF radio station and the calling HF radio station, as described earlier herein, inter alia with reference to FIG. 3, an adjustable-bandwidth tunable bandpass filter 215 of the called HF radio station can be configured to obtain one or more analog data traffic signals from the calling HF radio station, from (e.g., via) at least one antenna of the called HF radio station, along the given assigned ALE channel (block 404).

Adjustable-bandwidth tunable bandpass filter 215 can be configured to provide the analog data traffic signals (block 408).

Optional LNA 220 can be configured to amplify the analog data traffic signals to generate one or more modified data traffic signals (block 412).

First receive path conversion circuit 223 can be configured to convert the modified data traffic signals or the analog data traffic signals to one or more digital data traffic signals (block 416).

A given receiver (e.g., 210-*a*, 210-*b*, 210-*c*, . . . , 210-*n*), configured to monitor the given assigned ALE channel, can be configured to decode the digital data traffic signals (block 420).

Attention is now drawn to FIG. 5, a schematic illustration of an example of a second transceiver 500 for a high frequency (HF) radio station (e.g., a HF mobile radio station 120, a HF base station 110) in a staring ALE network 100, in accordance with the presently disclosed subject matter.

In accordance with the presently disclosed subject matter, the second transceiver 500 can be configured to include a staring receiver 510. The staring receiver 510 can be configured to include a plurality of parallel receivers (e.g., receiver 510-*a*, receiver 510-*b*, receiver 510-*c*, . . . , receiver 510-*n*). The plurality of parallel receivers (e.g., receivers 510-*a*, 510-*b*, 510-*c*, . . . , 510-*n*) can be configured to simultaneously monitor a corresponding plurality of assigned ALE channels within a staring frequency band for one or more digital control signals, including, inter alia, one or more digital calling signals that are indicative of a corresponding one or more incoming calls to the HF radio station. Each receiver (e.g., 510-*a*, 510-*b*, 510-*c*, . . . , 510-*n*) of the staring receiver 510 can be configured to decode digital HF signals, whether digital control signals or digital data traffic signals, that are received by the second transceiver 500 along an assigned ALE channel that is monitored by the respective receiver.

Second transceiver 500 can be further configured to include a digital controller 550. Digital controller 550 can be one or more processing units (e.g. central processing units), microprocessors, microcontrollers (e.g. microcontroller units (MCUs)) or any other computing devices or modules, including multiple and/or parallel and/or distributed processing units.

Digital controller 550 can be configured to select the staring frequency band and the assigned ALE channels. The staring frequency band can be a subset of the HF band. The staring frequency band can be selected to improve a detection of incoming calls by the HF radio due to the filtering out of interfering HF signals, while maintaining the fast link establishment that characterizes a HF radio in a staring ALE network 100.

In some cases, the staring frequency band and the assigned ALE channels can be selected, at least in part, based on values of parameters that are indicative of ionospheric propagation conditions at a given time. In some cases, the given time can be a current time, i.e., a time at which the staring frequency band and the assigned ALE channels are selected. In some cases, the given time can be prior to the current time, provided that the ionospheric propagation conditions at the current time are expected to be the same as or similar to the ionospheric propagation conditions at the given time. Selection of the staring frequency band in accordance with ionospheric propagation conditions at the given time improves the detection of incoming calls by the HF radio by filtering out interfering HF signals in parts of the HF band that are not suitable for ionospheric radio communications.

The parameters that are indicative of ionospheric propagation conditions can include, but are not limited to, one or more of: a calendar date, a time of day at a geographical location of the HF radio, a time of day at a geographical location of one or more other HF radios in the staring ALE network 100, a geographical location of the HF radio, a geographical location of one or more other HF radios in the staring ALE network 100, or a distance between the HF radio and one or more other HF radios in the staring ALE network 100.

In some cases, the staring frequency band and the assigned ALE channels can be selected based on values of parameters that are indicative of ionospheric propagation conditions at the given time, in accordance with an analysis of a quality of signal reception over ALE channels at a plurality of times in the past, the analysis being indicative of a relationship between the parameters and the ionospheric propagation conditions.

In some cases, the staring frequency band and the assigned ALE channels can be selected, at least in part, to prevent one or more expected interfering HF signals from being included within the staring frequency band. In some cases, the staring frequency band and the assigned ALE channels can be selected to prevent one or more expected interfering HF signals from being included within the staring frequency band based on an analysis of a quality of signal reception over ALE channels at a plurality of times in the past, the analysis being indicative of the expected interfering HF signals.

In some cases, digital controller 550 can be configured to narrow the staring frequency band to prevent one or more actual interfering HF signals from being included within the staring frequency band.

As noted inter alia, the bandwidth of the staring frequency band can be adjusted over time. This is very useful in HF ionospheric radio communications since the range of frequencies that can be used by a HF radio station performing HF ionospheric radio communications varies greatly over time in accordance with varying ionospheric propagation conditions over time, such that it is desirable to vary the bandwidth of the staring frequency band over time. Moreover, by enabling adjustment of the staring frequency band over time, the present disclosure enables the exclusion of certain HF interfering signals from the staring frequency band.

Second transceiver 500 can be configured to include an adjustable-bandwidth tunable bandpass filter 515.

Adjustable-bandwidth tunable bandpass filter 515 can be configured to obtain, from (e.g., via) at least one antenna connected to second transceiver 500, one or more first HF signals 512 within a HF band. Adjustable-bandwidth tunable bandpass filter 515 can be further configured to provide only one or more second HF signals 517 within the staring frequency band. The adjustable-bandwidth tunable bandpass filter 515 can be configured to obtain the first HF signals 512 via a receiver/transmitter (RX/TX) switch (SW) 590 that is connected to the at least one antenna.

Adjustable-bandwidth tunable bandpass filter 515 can be configured to comprise an adjustable high pass filter (HPF) and an adjustable low pass filter (LPF) connected in series (not shown), wherein the first cut-off frequency of the HPF and the second cut-off frequency of the LPF are configured to be independently adjustable (not shown). This enables the bandwidth of the staring frequency band to be adjusted, which is of a great benefit in improving reception capability by the HF radio system, as detailed earlier herein, inter alia. The staring frequency band can be adjusted to be between 4% and 100% of the HF band. In some cases, the first cut-off frequency can be one of the following frequencies: 1.5 MHz, 2.43 MHz, 3.7 MHz, 5.6 MHz, 8.5 MHz, 13 MHz and 19.8 MHz. In some cases, the second cut-off frequency can be one of the following frequencies: 2.43 MHz, 3.7 MHz, 5.6 MHz, 8.5 MHz, 13 MHz, 19.8 MHz and 30 MHz.

Digital controller 550 can be configured to select the staring frequency band by independently adjusting the first cut-off frequency of the HPF of the adjustable-bandwidth tunable bandpass filter 515 and the second cut-off frequency of the LPF of the adjustable-bandwidth tunable bandpass filter 515.

Second transceiver 500 can be configured to include a first receive path for processing control signals. First receive path can be configured to convert the second HF signals 517 to one or more first digital HF signals 538 obtained by the staring receiver 510. In some cases, the second HF signals 517 can include a given analog calling signal that is received from another HF radio station (i.e., a calling HF radio station), and the first receive path can be configured to convert the given analog calling signal to a given digital calling signal, as detailed further herein, inter alia with reference to FIG. 6.

The first receive path can be configured to include, optionally, a low-noise amplifier (LNA) 520. In addition, first receive path can be configured to include a radio frequency (RF) splitter 525, and a first receive path conversion circuit 530.

Low-noise amplifier (LNA) 520 can be configured to amplify the second HF signals 517 to generate one or more modified HF signals 522. In some cases, LNA 520 can be provided prior to adjustable-bandwidth tunable bandpass filter 515.

Radio frequency (RF) splitter 525 can be configured to split the modified HF signals 522 or the second HF signals 517 into one or more split HF signals 527.

First receive path conversion circuit 530 can be configured to convert split HF signals 527 that are control signals to one or more first digital HF signals 538. In some cases, first receive path conversion circuit 530 can be configured to comprise a first amplification circuit (AMP1) 532, including one or more amplifiers, and a first analog-to-digital converter (ADC1) 536. First amplification circuit 532 can be configured to amplify the split HF signals 527 to generate one or more first amplified HF signals 534. First ADC (ADC1) 536 can be configured to convert the first amplified HF signals 534 to the first digital HF signals 538.

Second transceiver 500 can be configured to include a second receive path for processing data traffic signals, the staring receiver 510 being connected to the second receive path. The second receive path can be configured to convert the second HF signals 517 that are data traffic signals to one or more second digital HF signals 548 obtained by the staring receiver 510. In some cases, the second HF signals 517 can include one or more given analog data traffic signals that are received from another HF radio station (i.e., a calling HF radio station), and the second receive path can be configured to convert the given analog data traffic signals to one or more given digital data traffic signals, as detailed further herein, inter alia with reference to FIG. 7.

The second receive path can be configured to include the optional low-noise amplifier (LNA) 520, the RF splitter 525, an optional HF narrowband tunable bandpass filter 570, and a second receive path conversion circuit 540.

Second receive path can be configured to obtain the second HF signals 517 from adjustable-bandwidth tunable bandpass filter 515.

LNA 520 can be configured to amplify the second HF signals 517 to generate one or more modified HF signals 522.

RF splitter 525 can be configured to split the modified HF signals 522 or the second HF signals 517 to generate one or more split HF signals 527.

Second receive path conversion circuit 540 can be configured to convert split HF signals 527 to one or more second digital HF signals 548. In some cases, second receive path conversion circuit 540 can be configured to comprise a second amplification circuit (AMP2) 542, including one or more amplifiers, and a second ADC (ADC2) 546. Second amplification circuit 542 can be configured to amplify the split HF signals 527 to generate one or more second amplified HF signals 544. Second ADC 546 can be configured to convert the second amplified HF signals 544 to the second digital HF signals 548.

In some cases, first amplification circuit 532 can be configured to have a low gain, low levels of signal-to-noise ratio (SNR) (even negative SNR) and high selectivity. Conversely, in some cases, second amplification circuit 542 can be configured to have a high gain, high levels of SNR and low selectivity. Put differently, the first amplification circuit 532 can be configured to have a lower gain and SNR than the second amplification circuit 542 and a higher selectivity than the second amplification circuit 542. In this manner, the second transceiver 500 can be configured to have a high selectivity for link establishment, and high gain for processing incoming data traffic.

An optional HF narrowband tunable bandpass filter 570 can be configured to pass the split HF signals 527 that are data traffic signals to the second receive path conversion circuit 540 while rejecting noise that is present in the split HF signals 527. The HF narrowband tunable bandpass filter 570 can be configured to have a passband that is identical to a passband of the given assigned HF channel along which the data traffic signals are received. Digital controller 550 can be configured to select the passband for the HF narrowband tunable bandpass filter 570.

In some cases, since control signals and data traffic signals are received on different paths, the plurality of receivers (e.g., 510-a, 510-b, 510-c, . . . , 510-n) can be configured to decode one or more digital control signals (e.g., one or more digital calling signals) concurrently with a given receiver of the receivers decoding one or more digital data traffic signals.

Second transceiver 500 can be further configured to include a transmit path 552 for the transmission of HF signals to other HF radio stations. Transmit path 552 can be configured to include a modulator 556, a transmission conversion circuit 560, an optional HF narrowband tunable bandpass filter 570, a power amplifier (PA) 575, and a harmonic filter 580.

Digital controller 550 can be configured to provide, to the modulator 556, one or more digital baseband signals 554 comprising information to be transmitted to another HF radio station (not shown).

Modulator 556 can be configured to modulate the digital baseband signals 554, thereby generating one or more digital HF transmission signals 558 having a frequency associated with a given assigned ALE channel of the assigned ALE channels for the HF radio station.

Transmission conversion circuit 560 can be configured to convert the digital HF transmission signals 558 to one or more modified analog HF transmission signals 568. In some cases, transmission conversion circuit 560 can be configured to include a digital-to-analog converter (DAC) 562 and a transmitting amplifier (AMP-T) 566. DAC 562 can be configured to convert the digital HF transmission signals 558 to one or more analog HF transmission signals 564. Transmitting amplifier 566 can be configured to amplify the analog HF transmission signals 564 to generate one or more modified analog HF transmission signals 568.

The optional HF narrowband tunable bandpass filter 570 can be configured to pass the modified analog HF transmission signals 568 including the information to be transmitted to the another HF radio station while rejecting noise that is present in the modified analog HF transmission signals 568, thereby generating one or more noise-compensated HF transmission signals 572. Digital controller 550 can be configured to tune the HF narrowband tunable bandpass filter 570 to pass only the HF signals that are transmitted along the given assigned ALE channel.

Power amplifier (PA) 575 can be configured to amplify the noise-compensated HF transmission signals 572 or the modified analog HF transmission signals 568 to generate one or more amplified HF transmission signals 577 having enough power to be transmitted to the another HF radio station, via the at least one antenna.

Harmonic filter 580 can be configured to reduce harmonics that are present in the amplified HF transmission signals 577 to tolerable levels, thereby generating one or more compensated amplified HF transmission signals 582.

The compensated amplified HF transmission signals 582 can be provided to the at least one antenna for transmission thereof, via RX/TX switch (SW) 590. RX/TX switch 590 can also be configured to include an antenna coupler (not shown) to increase the power of the compensated amplified HF transmission signals 582.

Figure 6:
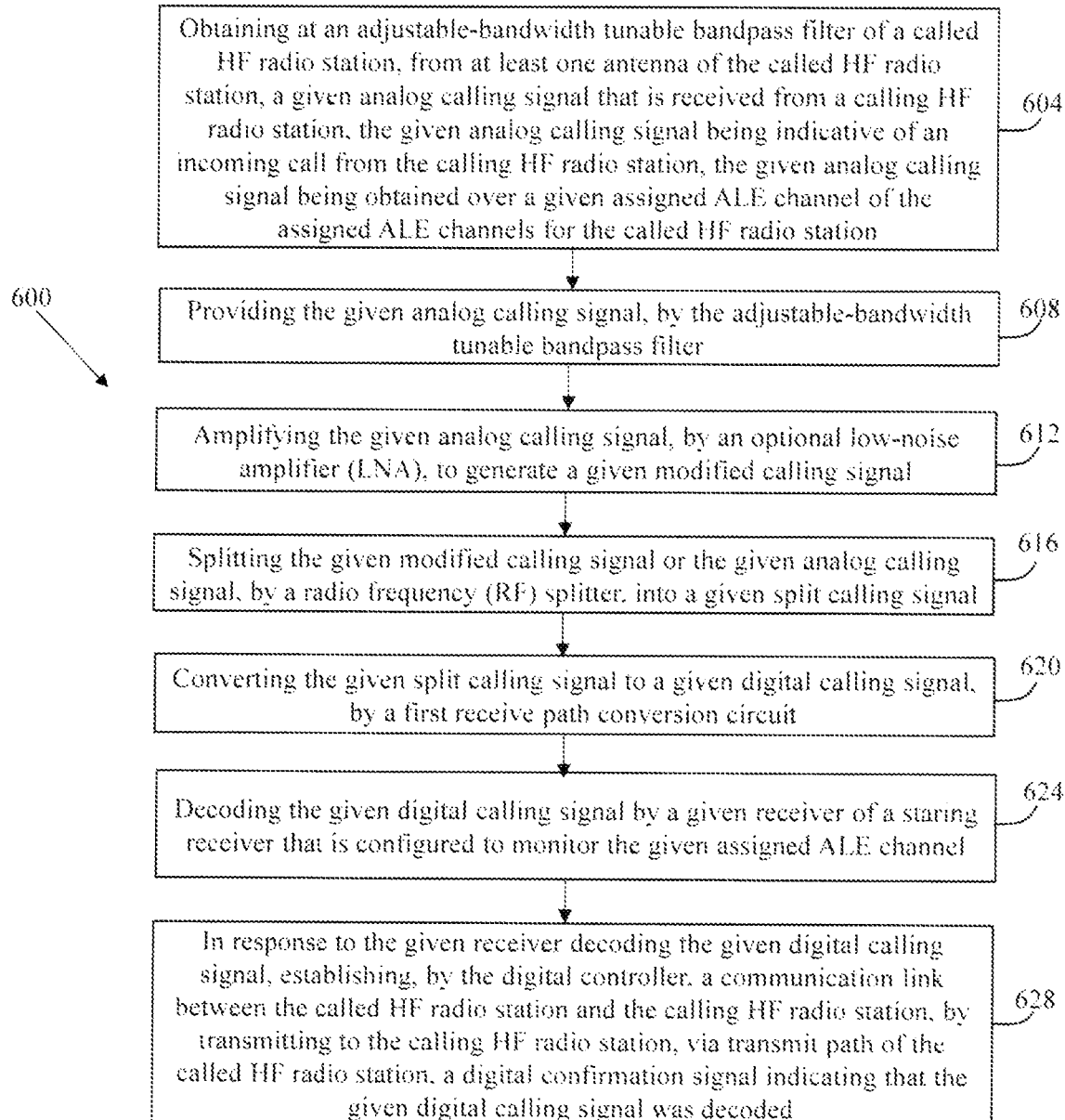
FIG. 6 is a flowchart illustrating an example of a method for a called HF radio station to establish a communication link with a calling HF radio station using the second transceiver schematically illustrated in FIG. 5, in accordance with the presently disclosed subject matter.

Attention is now drawn to FIG. 6, a flowchart illustrating an example of a method 600 for a called HF radio station to establish a communication link with a calling HF radio station using the second transceiver 500 schematically illustrated in FIG. 5, in accordance with the presently disclosed subject matter.

In accordance with the presently disclosed subject matter, an adjustable-bandwidth tunable bandpass filter 515 of the called HF radio station can be configured to obtain, from (e.g., via) at least one antenna of the called HF radio station, a given analog calling signal that is received from a calling HF radio station, the given analog calling signal being indicative of an incoming call from the calling HF radio station (block 604). The given analog calling signal can be obtained over a given assigned ALE channel of the assigned ALE channels for the called HF radio station.

Adjustable-bandwidth tunable bandpass filter 515 can be further configured to provide the given analog calling signal (block 608).

Optional LNA 520 can be configured to amplify the given analog calling signal to generate a given modified calling signal (block 612).

Radio frequency (RF) splitter 525 can be configured to split the given modified calling signal or the given analog calling signal into a given split calling signal (block 616).

First receive path conversion circuit 530 can be configured to convert the given split calling signal to a given digital calling signal (block 620).

A given receiver (e.g., 510-a, 510-b, 510-c, . . . , 510-n), configured to monitor the given assigned ALE channel, can be configured to decode the given digital calling signal (block 624).

In response to the given receiver (e.g., 510-a, 510-b, 510-c, . . . , 510-n) decoding the given digital calling signal, the digital controller 550 can be configured to establish a communication link between the called HF radio and the calling HF radio by transmitting to the calling HF radio station, via transmit path 552 of the called HF radio station, a digital confirmation signal indicating that the given digital calling signal was decoded (block 628). The specifics of transmit path 552 are detailed earlier herein, inter alia with reference to FIG. 5.

Figure 7:
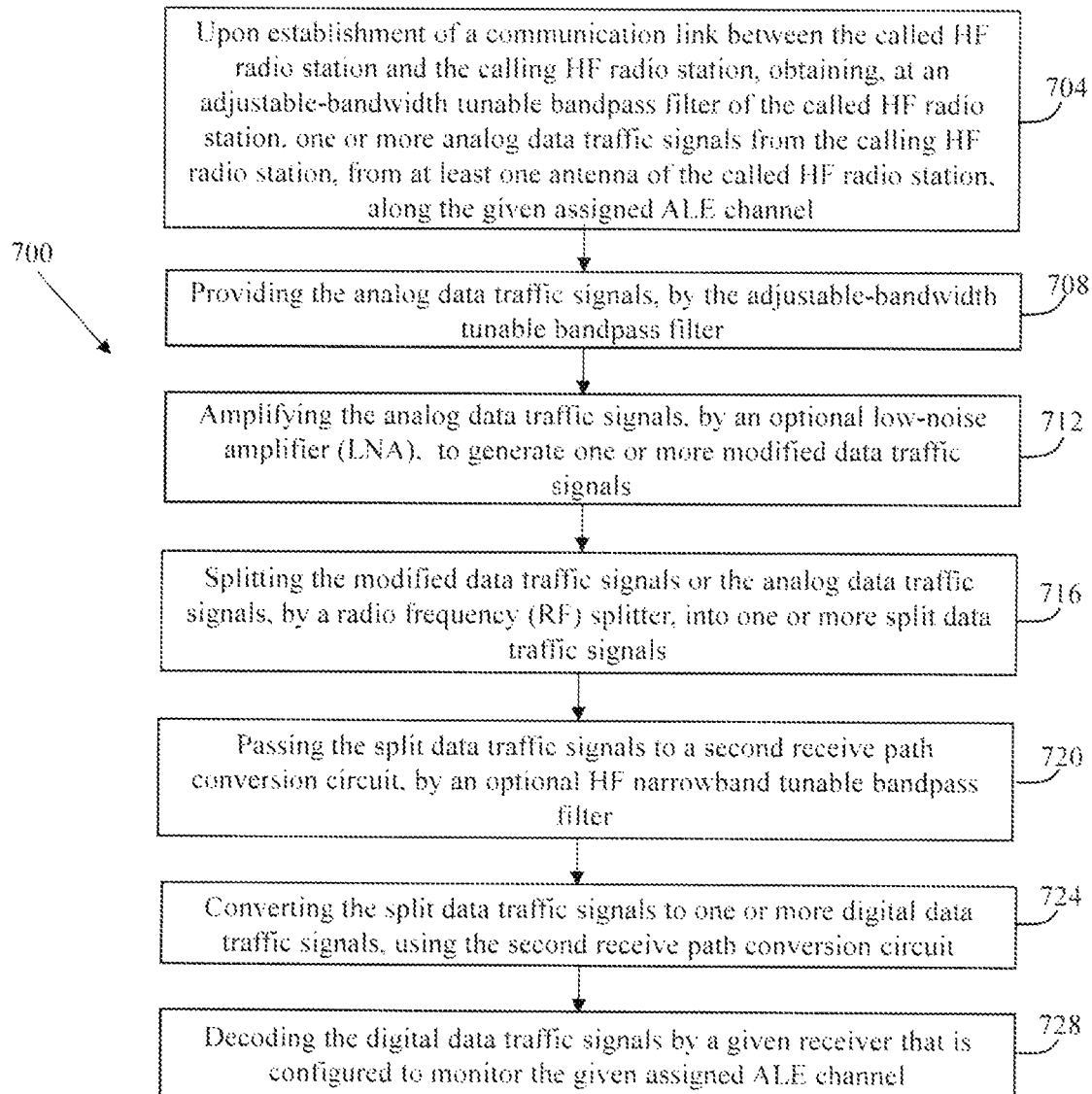
FIG. 7 is a flowchart illustrating an example of a method for a called HF radio station to decode data traffic signals received from a calling HF radio station using the second transceiver schematically illustrated in FIG. 5, in accordance with the presently disclosed subject matter.

Attention is now drawn to FIG. 7, a flowchart illustrating an example of a method 700 for a called HF radio station to decode data traffic signals received from a calling HF radio station using the second transceiver 500, in accordance with the presently disclosed subject matter.

In accordance with the presently disclosed subject matter, upon establishment of a communication link between the called HF radio station and the calling HF radio station, as described earlier herein, inter alia with reference to FIG. 6, an adjustable-bandwidth tunable bandpass filter 515 of the called HF radio station can be configured to obtain one or more analog data traffic signals from the calling HF radio station, from (e.g., via) at least one antenna of the called HF radio station, along the given assigned ALE channel (block 704).

Adjustable-bandwidth tunable bandpass filter 515 can be configured to provide the analog data traffic signals (block 708).

Optional LNA 520 can be configured to amplify the analog data traffic signals to generate one or more modified data traffic signals (block 712).

Radio frequency (RF) splitter 525 can be configured to split the modified data traffic signals or the analog data traffic signals into one or more split data traffic signals (block 716).

Optional HF narrowband tunable bandpass filter 570 can be configured to pass the split data traffic signals to the second receive path conversion circuit 540 (block 720).

Second receive path conversion circuit 540 can be configured to convert the split data traffic signals to one or more digital data traffic signals (block 724).

A given receiver (e.g., 510-a, 510-b, 510-c, . . . , 510-n) that is configured to monitor the given assigned ALE channel can be configured to decode the digital data traffic signals (block 728).

It is to be noted that, with reference to FIGS. 3, 4, 6 and 7, some of the blocks can be integrated into a consolidated block or can be broken down to a few blocks and/or other blocks may be added. It is to be further noted that some of the blocks are optional. It should be also noted that whilst the flow diagrams are described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A high frequency (HF) radio configured to process an incoming call from another HF radio, the HF radio comprising:
   a plurality of receivers configured to simultaneously monitor a corresponding plurality of assigned Automatic Link Establishment (ALE) channels within a staring frequency band for one or more digital calling signals that are indicative of incoming calls, wherein the staring frequency band is a subset of a HF band, and wherein a bandwidth of the staring frequency band is adjustable;
   an adjustable-bandwidth tunable bandpass filter configured to obtain, from at least one antenna, first HF signals within the HF band, and to provide only second HF signals within the staring frequency band, the second HF signals including one or more analog calling signals that are indicative of the incoming calls;
   a first receive path connected to an output of the adjustable-bandwidth tunable bandpass filter and configured to convert the analog calling signals to the digital calling signals; and
   a controller configured to:
      establish a communication link between the HF radio and the another HF radio, in response to a given receiver of the receivers decoding a given digital calling signal of the digital calling signals that is indicative of the incoming call from the another HF radio, the given digital calling signal being communicated from the another HF radio over a given assigned ALE channel of the assigned ALE channels; and
      select the staring frequency band and the assigned ALE channels, based on values of parameters that are indicative of ionospheric propagation conditions;
   wherein the adjustable-bandwidth tunable bandpass filter comprises an adjustable high pass filter (HPF) and an adjustable low pass filter (LPF) connected in series, and wherein the controller is configured to select the staring frequency band by independently adjusting a first cut-off frequency of the HPF and a second cut-off frequency of the LPF; wherein the first receive path comprises: a first amplification circuit coupled to an output of the adjustable-bandwidth tunable bandpass filter and configured to generate amplified calling signals based on the analog calling signals; and a first analog-to-digital converter (ADC) connected to an output of the first amplification circuit and configured to convert the amplified calling signals to the digital calling signals; and wherein, upon establishment of the communication link between the HF radio and the another HF radio, the adjustable-bandwidth tunable bandpass filter is configured to obtain one or more analog data traffic signals from the another HF radio over the given assigned ALE channel.

2. The HF radio of claim 1, wherein the parameters include one or more of: a calendar date, a time of day at a geographical location of the HF radio, a time of day at a geographical location of the another HF radio, a geographical location of the HF radio, a geographical location of the another HF radio, or a distance between the HF radio and the another HF radio.

3. The HF radio of claim 1, wherein the controller is configured to select the staring frequency band and the assigned ALE channels based on an analysis of a quality of signal reception over ALE channels at a plurality of times in the past, the analysis being indicative of a relationship between the parameters and the ionospheric propagation conditions.

4. The HF radio of claim 1, wherein the controller is configured to select the staring frequency band and the assigned ALE channels to prevent one or more expected interfering HF signals from being included within the staring frequency band.

5. The HF radio of claim 1, wherein the controller is configured to narrow the staring frequency band to prevent one or more actual interfering HF signals from being included within the staring frequency band.

6. The HF radio of claim 1, wherein the controller is configured to narrow the staring frequency band, in response to the given receiver decoding the given digital calling signal.

7. The HF radio of claim 6, wherein the staring frequency band is narrowed such that a first passband of the staring frequency band is identical to a second passband of the given assigned ALE channel.

8. A method for a high frequency (HF) radio to process an incoming call from another HF radio, the method comprising:
selecting a staring frequency band and a plurality of assigned Automatic Link Establishment (ALE) channels within the staring frequency band, based on values of parameters that are indicative of ionospheric propagation conditions;
obtaining, at an adjustable-bandwidth tunable bandpass filter, from at least one antenna, first HF signals within a HF band;
providing, by the adjustable-bandwidth tunable bandpass filter, only second HF signals within the staring frequency band, the second HF signals including one or more analog calling signals that are indicative of incoming calls, wherein the staring frequency band is a subset of the HF band, and wherein a bandwidth of the staring frequency band is adjustable;
converting the analog calling signals to one or more digital calling signals that are indicative of the incoming calls, by a first receive path connected to an output of the adjustable-bandwidth tunable bandpass filter;
monitoring, by a plurality of receivers, the ALE channels, each receiver of the receivers being configured to monitor a different assigned ALE channel of the assigned ALE channels for the digital calling signals; and
establishing a communication link between the HF radio and the another HF radio, in response to a given receiver of the receivers decoding a given digital calling signal of the digital calling signals that is indicative of the incoming call from the another HF radio, the given digital calling signal being communicated from the another HF radio over a given assigned ALE channel of the assigned ALE channels; wherein the adjustable-bandwidth tunable bandpass filter comprises an adjustable high pass filter (HPF) and an adjustable low pass filter (LPF) connected in series, and wherein selecting the staring frequency band comprises: independently adjusting a first cut-off frequency of the HPF and a second cut-off frequency of the LPF; wherein converting the analog calling signals to the digital calling signals comprises: generating amplified calling signals, by a first amplification circuit coupled to an output of the adjustable-bandwidth tunable bandpass filter, based on the analog calling signals; and converting the amplified calling signals to the digital calling signals, by a first analog-to-digital converter (ADC) connected to an output of the first amplification circuit; and wherein, upon establishment of the communication link between the HF radio and the another HF radio, the adjustable-bandwidth tunable bandpass filter is configured to obtain one or more analog data traffic signals from the another HF radio over the given assigned ALE channel.

9. The method of claim 8, wherein the staring frequency band and the assigned ALE channels are selected based on an analysis of a quality of signal reception over ALE channels at a plurality of times in the past, the analysis being indicative of a relationship between the parameters and the ionospheric propagation conditions.

10. The method of claim 8, wherein the staring frequency band and the assigned ALE channels are selected to prevent one or more expected interfering HF signals from being included within the staring frequency band.

11. The method of claim 8, further comprising:
narrowing the staring frequency band to prevent one or more actual interfering HF signals from being included within the staring frequency band.

12. The method of claim 8, further comprising:
narrowing the staring frequency band, in response to the decoding of the given digital calling signal.

13. The method of claim 8, further comprising:
obtaining the analog data traffic signals at the first receive path;
converting the analog data traffic signals to digital data traffic signals, by the first receive path; and
decoding the digital data traffic signals, by the given receiver.

14. A non-transitory computer readable storage medium having computer readable program code embodied therewith, the computer readable program code, executable by at least one processor of a computer to perform a method for a high frequency (HF) radio to process an incoming call from another HF radio, the method comprising:
selecting a staring frequency band and a plurality of assigned Automatic Link Establishment (ALE) channels within the staring frequency band, based on values of parameters that are indicative of ionospheric propagation conditions;
obtaining, at an adjustable-bandwidth tunable bandpass filter, from at least one antenna, first HF signals within a HF band;
providing, by the adjustable-bandwidth tunable bandpass filter, only second HF signals within the staring frequency band, the second HF signals including one or more analog calling signals that are indicative of incoming calls, wherein the staring frequency band is a subset of the HF band, and wherein a bandwidth of the staring frequency band is adjustable;
converting the analog calling signals to one or more digital calling signals that are indicative of the incoming calls, by a first receive path connected to an output of the adjustable-bandwidth tunable bandpass filter;
monitoring, by a plurality of receivers, the ALE channels, each receiver of the receivers being configured to monitor a different assigned ALE channel of the assigned ALE channels for the digital calling signals; and
establishing a communication link between the HF radio and the another HF radio, in response to a given receiver of the receivers decoding a given digital calling signal of the digital calling signals that is indicative of the incoming call from the another HF radio, the given digital calling signal being communicated from the another HF radio over a given assigned ALE channel of the assigned ALE channels; wherein the adjustable-bandwidth tunable bandpass filter comprises an adjustable high pass filter (HPF) and an adjustable low pass filter (LPF) connected in series, and wherein selecting the staring frequency band comprises: independently adjusting a first cut-off frequency of the HPF and a second cut-off frequency of the LPF; wherein converting the analog calling signals to the digital calling signals comprises: generating amplified calling signals, by a first amplification circuit coupled to an output of the adjustable-bandwidth tunable bandpass filter, based on the analog calling signals; and converting the amplified calling signals to the digital calling signals, by a first analog-to-digital converter (ADC) connected to an output of the first amplification circuit; and wherein, upon establishment of the communication link between the HF radio and the another HF radio, the adjustable-bandwidth tunable bandpass filter is configured to obtain one or more analog data traffic signals from the another HF radio over the given assigned ALE channel.

* * * * *